United States Patent
Eirea et al.

(10) Patent No.: US 8,138,739 B1
(45) Date of Patent: Mar. 20, 2012

(54) CIRCUITS AND METHODS FOR IMPROVING TRANSIENT RESPONSE OF HYSTERETIC DC-DC CONVERTERS

(75) Inventors: Gabriel Eirea, Montevideo (UY); Jonathan Klein, Palo Alto, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 750 days.

(21) Appl. No.: 12/245,231

(22) Filed: Oct. 3, 2008

(51) Int. Cl.
*G05F 1/00* (2006.01)

(52) U.S. Cl. ......................................... 323/286; 323/271

(58) Field of Classification Search .......... 323/282–290, 323/271
See application file for complete search history.

(56) References Cited

U.S. PATENT DOCUMENTS

| | | | |
|---|---|---|---|
| 6,147,478 A * | 11/2000 | Skelton et al. | 323/288 |
| 6,583,610 B2 * | 6/2003 | Groom et al. | 323/271 |
| 6,791,306 B2 | 9/2004 | Walters et al. | |
| 6,922,044 B2 | 7/2005 | Walters et al. | |
| 7,019,502 B2 | 3/2006 | Walters et al. | |
| 7,132,820 B2 | 11/2006 | Walters et al. | |
| 7,202,642 B1 * | 4/2007 | Chen et al. | 323/282 |
| 7,457,140 B2 | 11/2008 | Klein | |
| 2008/0061750 A1 * | 3/2008 | Stoichita | 323/271 |
| 2008/0088284 A1 * | 4/2008 | Weng | 323/271 |
| 2008/0088292 A1 * | 4/2008 | Stoichita et al. | 323/285 |

OTHER PUBLICATIONS

Qahouq et al., Sep. 2007, IEEE, Trans Power Electronics, vol. 22, No. 5, 1806-1819.*
Peterchev, Angel V. and Sanders, Seth R., "Load-Line Regulation With Estimated Load-Current Feedforward: Application to Microprocessor Voltage Regulators", Nov. 2006, pp. 1704-1717, vol. 21, No. 6, IEEE Transactions on Power Electronics.

* cited by examiner

*Primary Examiner* — Jue Zhang
(74) *Attorney, Agent, or Firm* — Okamoto & Benedicto LLP

(57) ABSTRACT

A hysteretic DC-DC converter includes an observer circuit configured to generate an observer control signal for injection into the control loop of the converter. The observer circuit may be configured to differentiate the output voltage of the converter to generate a differentiated output voltage. A transconductance amplifier may be configured to output the observer control signal from the differentiated output voltage. The observer control signal may be injected into the control loop in a summing node.

20 Claims, 6 Drawing Sheets

US 8,138,739 B1

CIRCUITS AND METHODS FOR IMPROVING TRANSIENT RESPONSE OF HYSTERETIC DC-DC CONVERTERS

BACKGROUND OF THE INVENTION

1. Field of the Invention

The present invention relates generally to electrical circuits, and more particularly but not exclusively to voltage regulators.

2. Description of the Background Art

A DC-DC converter is a voltage regulator that receives a DC input voltage to generate a regulated DC output voltage. The output voltage is coupled to a load. A hysteretic DC-DC converter, such as bang-bang converter, is a type of DC-DC converter that maintains the output voltage within a hysteresis window relative to a reference voltage.

Hysteretic DC-DC converters are known for fast transient response. To ensure stability, the system gain and bandwidth may be reduced to provide adequate phase margin and avoid excessive ringing. The present disclosure pertains to improving the transient response of conventional hysteretic DC-DC converters without significantly adversely affecting stability.

SUMMARY

In one embodiment, a hysteretic DC-DC converter includes an observer circuit configured to generate an observer control signal for injection into the control loop of the converter. The observer circuit may be configured to differentiate the output voltage of the converter to generate a differentiated output voltage. A transconductance amplifier may be configured to output the observer control signal from the differentiated output voltage. The observer control signal may be injected into the control loop in a summing node. Among other advantages, the use of the observer circuit improves the transient response and enhances the stability of the converter.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
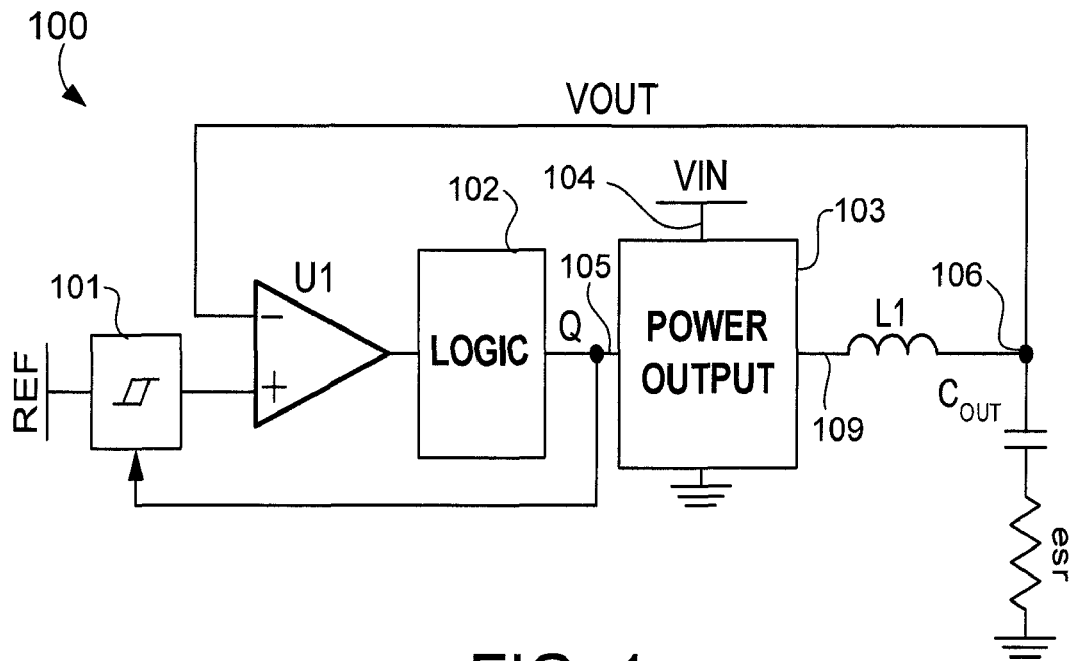
FIG. 1 schematically shows an example hysteretic DC-DC converter that may take advantage of embodiments of the present invention.

Generally speaking, a hysteretic DC-DC converter comprises a hysteretic comparator that compares the output voltage against a reference to determine when to set the power output high. This is illustrated in FIG. 1, where a hysteretic DC-DC converter 100 includes a comparator U1 that compares the output voltage VOUT on the output node 106 to a reference signal generated by a hysteresis and reference signal generator 101. The signal generator 101 generates a reference signal that is higher than the desired output voltage when the Q signal at node 105 is at a logical HIGH, and lower than the desired output voltage when the Q signal at node 105 is at a logical LOW. The converter 100 further includes a drive logic 102, a power output stage 103, an output inductor L1, and an output capacitor COUT ($C_{OUT}$).

In the example of FIG. 1, the drive logic 102 generates a drive signal Q on the node 105 based on the output of the hysteretic comparator U1. The drive signal Q is input to the power output stage 103. The power output stage 103 couples or decouples the input voltage VIN ($V_{IN}$) on the node 104 to the output inductor L1 on the switch node 109 based on the drive signal Q. In effect, the output of the hysteretic comparator U1 is used to regulate the output voltage VOUT.

Figure 2:
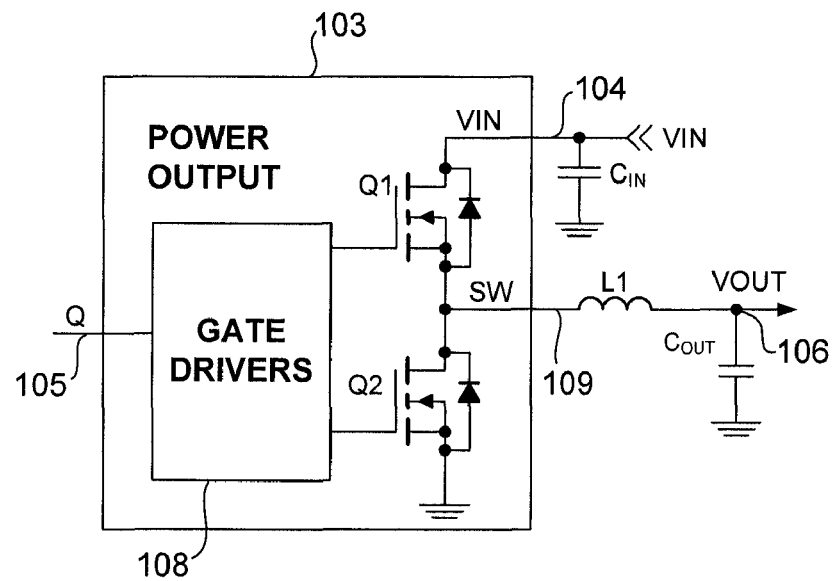
FIG. 2 schematically shows further details of a power output stage in the converter of FIG. 1.

FIG. 2 schematically shows further details of the power output stage 103. The nodes 104, 105, 106, and 109 are labeled both in FIGS. 1 and 2 to show how the power output stage 103 is coupled to the hysteretic DC-DC converter 100. As shown in FIG. 2, the power output stage 103 includes gate drivers 108 and synchronously switched transistors Q1 and Q2. The power output stage 103 may also have a non-synchronously switched transistor architecture without detracting from the merits of the present invention. A capacitor CIN ($C_{IN}$) serves as a decoupling capacitor for the input voltage VIN.

Referring back to FIG. 1, the resistor esr represents the effective series resistance (ESR) of the output capacitor COUT. The hysteretic DC-DC converter 100 is a relatively simple implementation where there is significant ESR in the output capacitor COUT, which causes the output voltage VOUT to exhibit a ripple voltage that is in phase with the inductor current (i.e., electrical current through the output inductor L1). If the capacitor COUT has insufficient ESR, a signal which produces a similar ramp can be added to the output voltage VOUT before being fed back to the hysteretic comparator U1 as in the hysteretic DC-DC converter 300 of FIG. 3.

Figure 3:
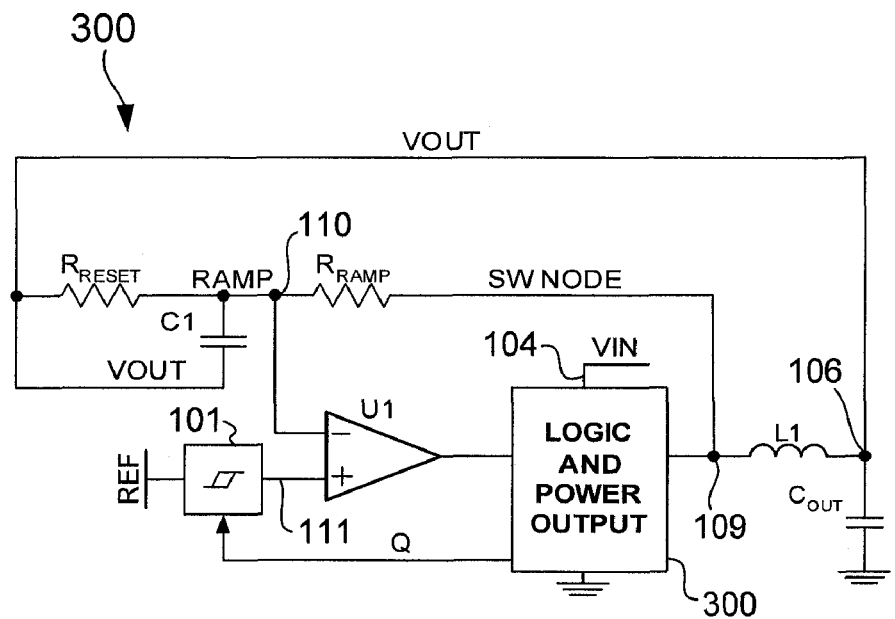
FIG. 3 schematically shows another example hysteretic DC-DC converter that may take advantage of embodiments of the present invention.

As shown in FIG. 3, the hysteretic DC-DC converter 300 includes the hysteretic comparator U1, the hysteresis and reference signal generator 101, the output inductor L1, and the output capacitor COUT. A logic and power output stage 300 includes both the drive logic 102 and the power output stage 103 of FIG. 1. The nodes 106, 104, and 109 are as described with reference to FIG. 1.

In the example of FIG. 3, the output capacitor COUT has insufficient ESR. The output voltage VOUT on the output node 106 is fed back into the control loop at the node 110 by way of a filter formed by a resistor RRESET ($R_{RESET}$) and a capacitor C1. The output of the logic and power output stage 300 on the switch node 109 is fed back into the control loop at the node 110 by way a resistor RRAMP ($R_{RAMP}$). The node 110 is tied to the negative input of the hysteretic comparator U1 for comparison to the reference signal on the node 111.

Figure 4:
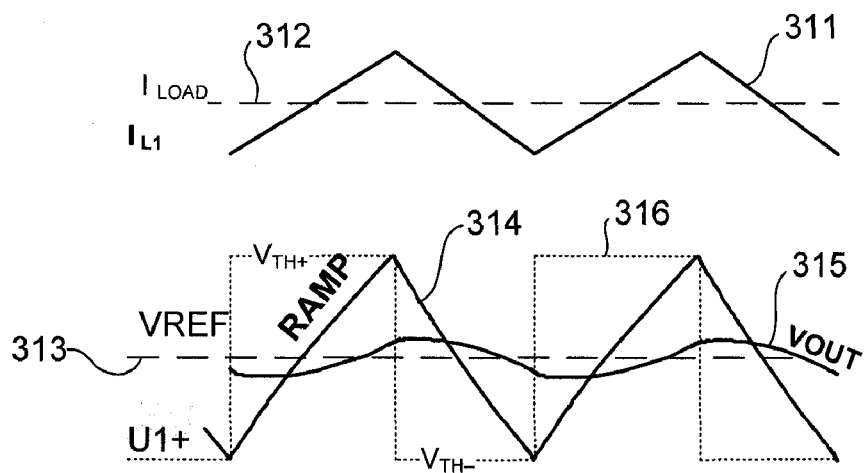
FIG. 4 shows control waveforms in the converter of FIG. 3.

FIG. 4 shows control waveforms in the converter 300 of FIG. 3. FIG. 4 shows the load current ILOAD ($I_{LOAD}$; see 312) delivered to a load coupled to the output node 106 relative to the electrical current flowing through the output inductor L1 ($I_{L1}$; see 311). FIG. 4 also shows the reference signal voltage (VREF; see 313) output of the hysteresis and reference signal generator 101 on the node 111 relative to the ramp signal on the node 110 (see 314), the output voltage VOUT (see 315), the positive hysteretic threshold voltage VTH+ ($V_{TH+}$), and negative hysteretic threshold voltage VTH− ($V_{TH-}$). The range of voltages between the positive and negative hysteretic threshold voltages represent the hysteretic window of the converter. The hysteretic window is set in the hysteresis and reference generator 101.

The operation of the converter 300 is as follows. When the negative input of the hysteretic comparator U1 ("U1−") is lower than the negative hysteretic threshold voltage VTH−, the logic and power output stage 300 connects the input voltage VIN on the node 104 to the output inductor L1 on the switch node 109, and signal generator 101 sets U1+ at node 111 to VTH+. This causes the resistor RRAMP to charge the voltage on U1− on the node 110 to the positive hysteretic threshold voltage VTH+. When the voltage on U1− on the node 110 reaches the positive hysteretic threshold voltage VTH+, the logic and power output stage 300 connects the output inductor L1 to ground (GND), and hysteresis and reference signal generator 101 sets U1+ at node 111 to VTH−. This causes the resistor RRAMP to discharge the voltage on U1− on the node 110 down towards the negative threshold voltage VTH−. Table 1 shows the states and the slopes of the output inductor L1 and the capacitor C1 in the converter 300.

TABLE 1

| Q | SW | L1 current Slope: ($dI_L/dt$) | C1 voltage Slope dV/dt |
|---|---|---|---|
| HIGH | VIN | $\dfrac{V_{IN} - V_{OUT}}{L}$ | $\dfrac{V_{IN} - V_{OUT}}{R_{RAMP} \cdot C1}$ |
| LOW | GND | $\dfrac{-V_{OUT}}{L}$ | $\dfrac{-V_{OUT}}{R_{RAMP} \cdot C1}$ |

Table 1 shows the logical values of the drive signal Q in the first column, the signal (either input voltage VIN or GND) on the switch node 109 depending on the state of the drive signal Q in the second column, the slope of the output inductor L1 in the third column, and the slope of the capacitor C1 in the fourth column.

Practical limitations prevent the control loop of the converter 100 of FIG. 1 and converter 300 of FIG. 3 from having ideal transient response. For example, the hysteresis window needs to be a minimum value with respect to the ramp amplitude to limit the loop gain. Also, the gain of the converter is proportional to resistors RRAMP/RRESET. For the system to be stable, the ramp must be nominally in phase with the inductor current. This limits the allowable gain, thereby slowing the transient response.

Figure 5:
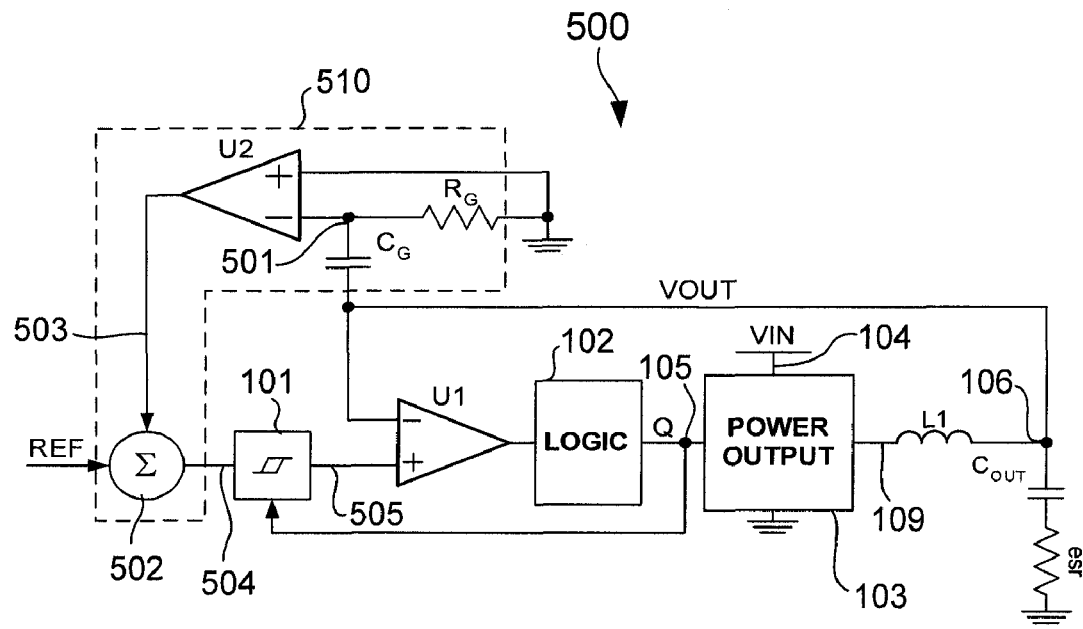
FIG. 5 schematically shows a hysteretic DC-DC converter in accordance with an embodiment of the present invention.

Referring now to FIG. 5, there is schematically shown a hysteretic DC-DC converter 500 in accordance with an embodiment of the present invention. In the example of FIG. 5, the general operation of the hysteresis and reference signal generator 101, the hysteretic comparator U1, the drive logic 102, the power output stage 103, the output inductor L1, and the output capacitor COUT is as described with reference to FIG. 1. The nodes 104, 105, 106, and 109 are also as in FIG. 1. The resistor esr represents the ESR of the output capacitor COUT.

In the example of FIG. 5, the hysteretic DC-DC converter 500 includes an observer circuit 510. In one embodiment, the observer circuit 510 comprises electrical circuitry configured to differentiate the output voltage VOUT on the node 106 to generate an observer control signal on the node 503 for addition back to the control loop of the converter to enable a faster transient response. Generally speaking, the observer control signal provides output current feed forward information that can be injected into the control loop to allow for faster response to changes in load current. In the example of FIG. 5, the observer control signal is injected into the control loop by way of the summing node 502.

The observer control signal generated by the observer circuit 510 represents the difference between the inductor current ($I_L$) through the output inductor L1 and the load current ($I_{LOAD}$) supplied to the load. More specifically, the slope of the output voltage VOUT, $$\left(\frac{dV_{OUT}}{dt}\right),$$

is proportional to the current surplus or deficit ($I_L - I_{LOAD}$) between the inductor current and the load current, $$\frac{dV_{OUT}}{dt} = \frac{I_L - I_{LOAD}}{C_{OUT}} \quad \text{(EQ. 1)}$$

Therefore, the observer circuit 510 can generate an observer control signal having a magnitude proportional to the difference between the load current and the inductor current by differentiating the output voltage VOUT.

In the example of FIG. 5, the observer circuit 510 comprises an amplifier U2, a summing node 502, and a differentiator circuit comprising a capacitor CG ($C_G$) and a resistor RG ($R_G$). The differentiator circuit differentiates the output voltage VOUT and presents the differentiated output voltage VOUT on the node 501. In the example of FIG. 5, the output voltage VOUT is connected to a terminal of the capacitor CG, which is in series with the resistor RG. The voltage across the resistor RG is amplified by the amplifier U2.

As explained, the differentiated output voltage VOUT represents the difference between the inductor current and the load current. The differentiated output voltage VOUT is amplified by the amplifier U2, which output is summed with the reference voltage REF by the summing node 502 to generate an adjusted reference voltage on the node 504. The adjusted reference voltage is used by the hysteresis and reference signal generator 101 to generate the reference signal on the node 505. In effect, the observer control signal changes the reference voltage such that the hysteresis and reference signal generator 101 generates a reference signal on the node 505 that more timely reflects the difference between the inductor current and the load current, enabling the converter 500 to have a relatively fast response time.

The gain and time constant of the observer control signal may be controlled by adjusting the gain of the amplifier U2 and value of the resistor RG and capacitor CG to accommodate variations in output inductor current L1 and output capacitor COUT. The control loop may be tuned empirically by setting RG*CG to equal the duration of the transient at the output voltage VOUT when the control loop is running with the observer circuit 510 disabled. The observer gain, which is the gain of the amplifier U2 in the example of FIG. 5, may also be adjusted empirically to maximize both phase margin and loop bandwidth. A gain of between two and four for the amplifier U2 has been shown to be optimum.

In light of the present disclosure, those of ordinary skill in the art will appreciate that there are other ways of developing the observer control signal and injecting it into the control loop of a hysteretic DC-DC converter without detracting from the merits of the present invention.

Figure 6:
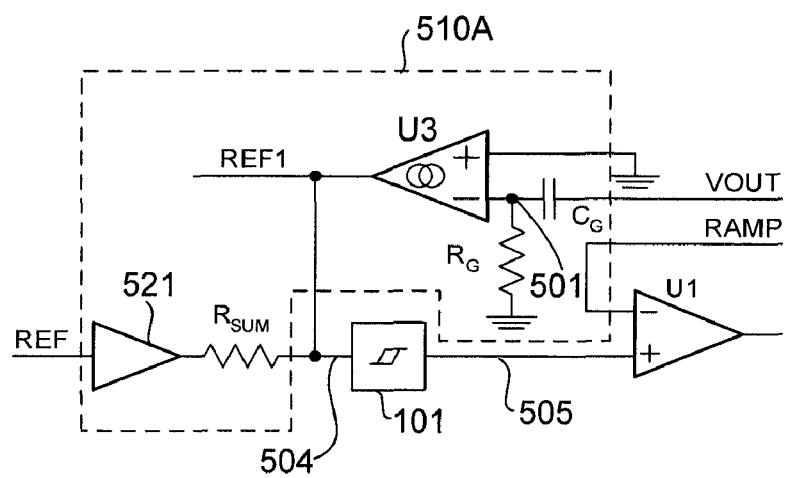
FIG. 6 schematically shows an observer circuit in accordance with an embodiment of the present invention.

FIG. 6 schematically shows an observer circuit 510A in accordance with an embodiment of the present invention. The observer circuit 510A is a particular embodiment of the observer circuit 510 of FIG. 5. In the example of FIG. 6, the differentiator circuit comprising the capacitor CG ($C_G$) and the resistor RG ($R_G$) differentiates the output voltage VOUT and presents the differentiated output voltage VOUT on the node 501. A transconductance amplifier U3 produces a current proportional to the differentiated output voltage VOUT signal on the negative input of the amplifier U3 on the node 501. The output of the transconductance amplifier U3 is an observer control signal (labeled "REF1") added to the reference voltage REF on the summing resistor RSUM ($R_{SUM}$) to generate an adjusted reference voltage at the node 504. The observer gain ($G_O$) is therefore:

$$G_O = gm(U3) \cdot R_{SUM} \quad (EQ. 2)$$

where gm(U3) is the gain of the transconductance amplifier U3. The reference voltage REF is fed to the resistor RSUM by way of a buffer 521. The ramp signal RAMP on the negative input of the hysteretic comparator U1 represents output voltage feedback summed with a signal proportional to the AC component of the inductor current.

Figure 7:
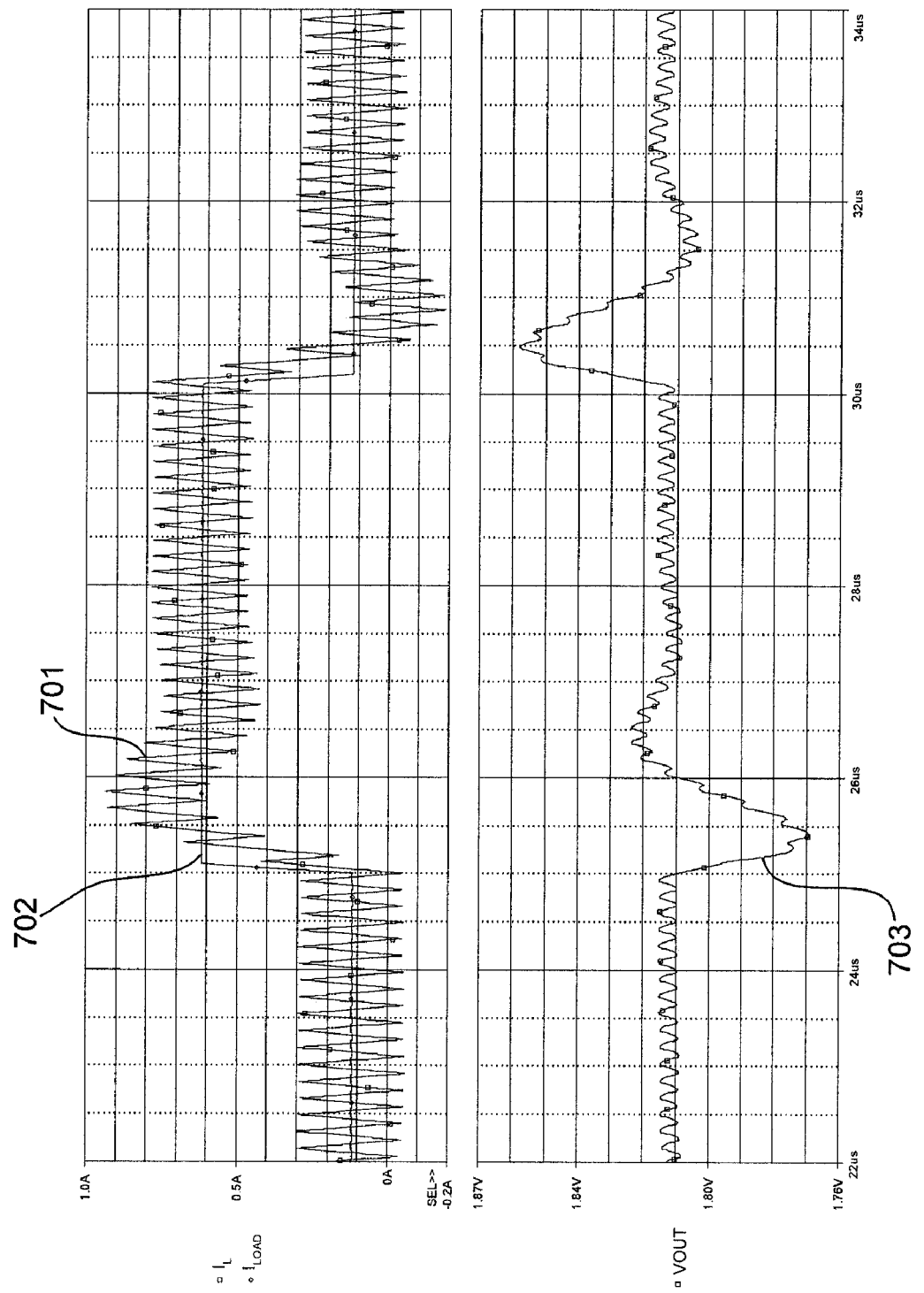
FIGS. 7 and 8 show simulation waveforms comparing the transient response of hysteretic DC-DC converters with and without an observer circuit.
Figure 8:
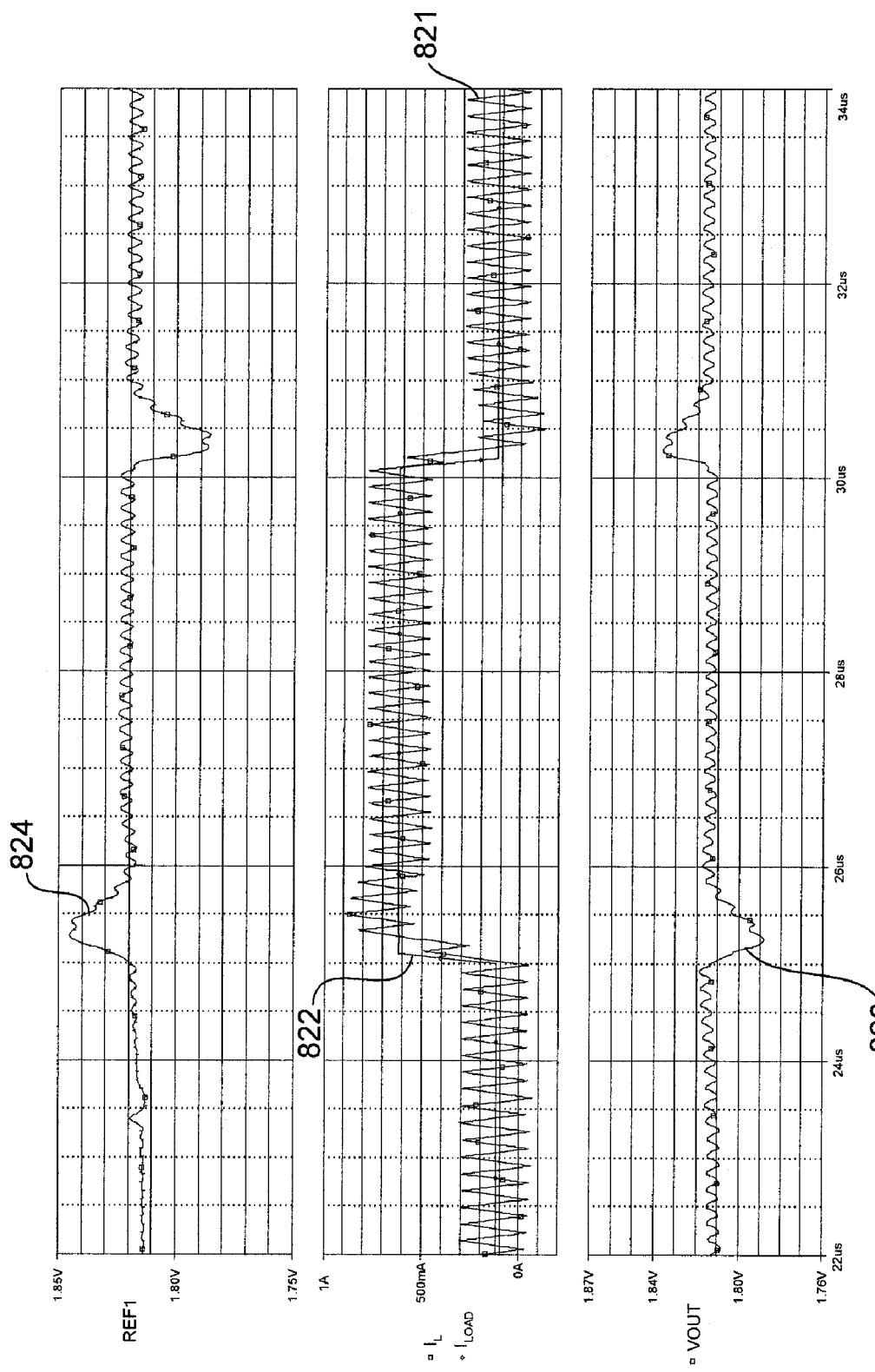

FIGS. 7 and 8 show simulation waveforms comparing load transient response using a 6 Mhz hysteretic controller under the following conditions: VIN=3.6V, VOUT=1.82V, L1=470 nH, COUT=2 µF, 500 mA load step ($T_R=T_F=100$ ns) applied @ T=25 µs.

FIG. 7 shows the transient response of a hysteretic DC-DC converter without an observer circuit, such as the converter 100 of FIG. 1. FIG. 7 shows the load current (see 702) relative to the inductor current (see 701), and the output voltage VOUT (see 703).

FIG. 8 shows the transient response of a hysteretic DC-DC converter with an observer circuit, such as the converter 500 of FIG. 5. FIG. 8 shows the load current (see 822) relative to the inductor current (see 821), and the output voltage VOUT (see 823). FIG. 8 also shows the observer control signal (see 824) generated by the observer circuit. Such an observer control signal may be the output of the amplifier U2 in FIG. 5 or the output of the amplifier U3 in FIG. 6. The change in the output voltage of the converter with the observer circuit (FIG. 8) is about plus or minus 23 mV, while the change in the output voltage of the converter without an observer circuit (FIG. 7) is about plus or minus 42 mV. The addition of an observer circuit thus results in about 2:1 improvement in transient response.

Figure 9:
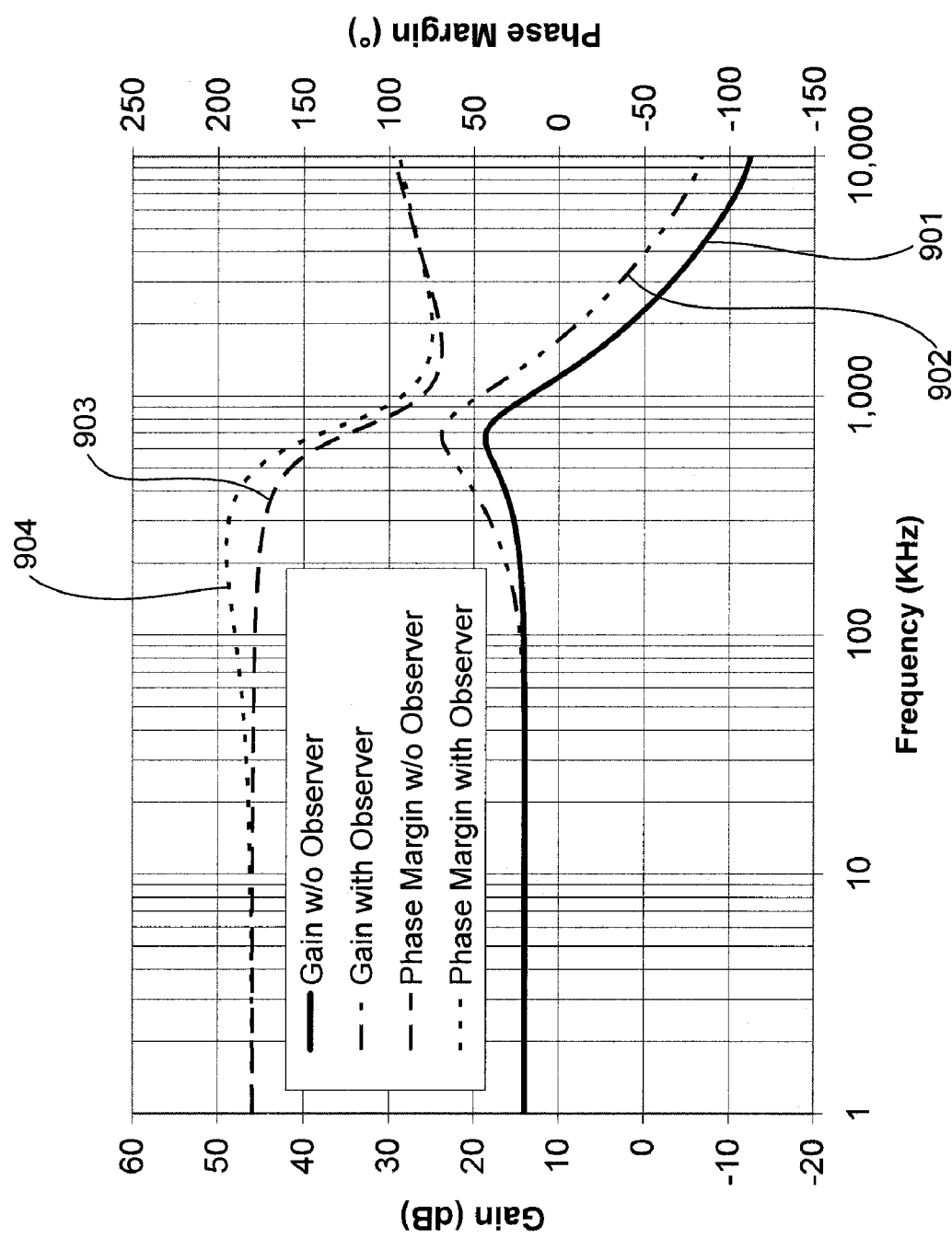
FIG. 9 shows simulation plots comparing the gain and phase margins of hysteretic DC-DC converters with and without an observer circuit.

FIG. 9 shows simulation plots comparing the gain and phase margins of hysteretic DC-DC converters with (e.g., converter 500 of FIG. 5) and without (e.g., converter 100 of FIG. 1) an observer circuit. In FIG. 9, plot 901 is the loop gain of the converter without an observer circuit, plot 902 is the loop gain of the converter with an observer circuit, plot 903 is the phase margin of the converter without an observer circuit, and plot 904 is the phase margin of the converter with an observer circuit. A summary of the plots of FIG. 9 is shown in Table 2

TABLE 2

|  | Loop Bandwidth (0 db crossover) | Phase Margin |
|---|---|---|
| No Observer circuit | 2.2 Mhz. | 70° |
| With Observer circuit | 3.8 Mhz. | 76° |

As indicated in Table 2, the use of an observer circuit almost doubles the loop bandwidth with no significant degradation in phase margin.

As can be appreciated from the foregoing, embodiments of the present invention can be readily adapted to existing hysteretic DC-DC converters to improve their transient response without decreasing their hysteresis band. Conversely, embodiments of the present invention allow for similar performance as existing hysteretic DC-DC converters with a larger hysteresis band and improved noise immunity. Embodiments of the present invention thus give the circuit designer more freedom in tuning the dynamic response of a hysteretic DC-DC converter.

Improved hysteretic DC-DC converters have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of operating a hysteretic DC-DC converter, the method comprising:
monitoring an output voltage of a hysteretic DC-DC converter, the output voltage being coupled to a load;
differentiating the output voltage to generate a control signal indicative of a difference between current drawn by the load and current flowing through an output inductor of the converter;
injecting the control signal into a control loop of the converter, and
adjusting a reference signal to a hysteretic comparator of the converter based at least on the control signal injected into the control loop.

2. The method of claim 1 wherein injecting the control signal into the control loop of the converter comprises:
converting the differentiated output voltage to current using a transconductance amplifier to generate the control signal; and
summing the control signal with a reference voltage to generate an adjusted reference voltage.

3. The method of claim 2 wherein the adjusted reference voltage is used to generate the reference signal that is compared by the hysteretic comparator of the converter to another signal indicative of the output voltage.

4. The method of claim 1 wherein injecting the control signal into the control loop of the converter comprises:
converting the differentiated output voltage to current using a transconductance amplifier to generate the control signal; and
subtracting the control signal with a feedback signal from the output voltage to generate an adjusted reference voltage.

5. The method of claim 1 further comprising:
amplifying the differentiated output voltage to generate the control signal;

summing the control signal with a reference voltage to generate an adjusted reference voltage;

generating the reference signal based on the adjusted reference voltage;

coupling the reference signal to an input of the hysteretic comparator of the converter; and regulating the output voltage based on an output of the hysteretic comparator.

6. The method of claim 5 wherein the differentiated output voltage is amplified using a transconductance amplifier.

7. A hysteretic DC-DC converter comprising:
a power output stage configured to couple or decouple an input voltage to an output inductor to generate an output voltage;
a hysteretic comparator having an output node coupled to the power output stage; and
an observer circuit configured to differentiate the output voltage to generate an observer control signal and to inject the control signal into a control loop of the hysteretic DC-DC converter to adjust an input to the hysteretic comparator, the control signal being indicative of a difference between a current drawn by a load and a current flowing through the output inductor.

8. The hysteretic DC-DC converter of claim 7 wherein the observer circuit comprises a summing node configured to add the observer control signal to a reference voltage to generate an adjusted reference voltage that is coupled to an input of the hysteretic comparator.

9. The hysteretic DC-DC converter of claim 8 further comprising a reference signal generator configured to receive the adjusted reference voltage to generate a reference signal coupled to the input of the hysteretic comparator.

10. The hysteretic DC-DC converter of claim 7 wherein the power output stage comprises a pair of synchronously switched transistors.

11. The hysteretic DC-DC converter of claim 7 further comprising a logic circuit configured to receive an output of the hysteretic comparator to generate a drive signal for driving the power output stage.

12. The hysteretic DC-DC converter of claim 7 wherein the observer circuit comprises a differentiator circuit comprising a capacitor having a first terminal coupled to the output voltage and a second terminal coupled to a first terminal of a resistor.

13. The hysteretic DC-DC converter of claim 12 wherein the observer circuit further comprises an amplifier having a first input coupled to the second terminal of the capacitor and the first terminal of the resistor.

14. The hysteretic DC-DC converter of claim 13 wherein the amplifier comprises a transconductance amplifier.

15. A method of operating a hysteretic DC-DC converter, the method comprising:
generating a control signal indicative of output current of the converter;
injecting the control signal into a control loop of the hysteretic DC-DC converter; and
regulating the output voltage of the hysteretic DC-DC converter by adjusting an input to a hysteretic comparator of the hysteretic DC-DC converter based at least on the injected control signal.

16. The method of claim 15 wherein generating the control signal comprises:
differentiating the output voltage to generate a differentiated output voltage.

17. The method of claim 16 further comprising:
inputting the differentiate output voltage to a transconductance amplifier to generate the control signal.

18. The method of claim 15 wherein injecting the control signal into the control loop of the hysteretic DC-DC converter comprises:
summing the control signal with a reference voltage to generate an adjusted reference voltage.

19. The method of claim 18 further comprising:
using the adjusted reference voltage to generate a reference signal for comparison by the hysteretic comparator of the hysteretic DC-DC converter to another signal.

20. The method of claim 19 wherein the other signal is indicative of the output voltage of the hysteretic DC-DC converter.

* * * * *